L. L. KNOX & M. MURRAY.
OPEN HEARTH FURNACE.
APPLICATION FILED FEB. 17, 1908.
919,184.
Patented Apr. 20, 1909.
4 SHEETS—SHEET 2.
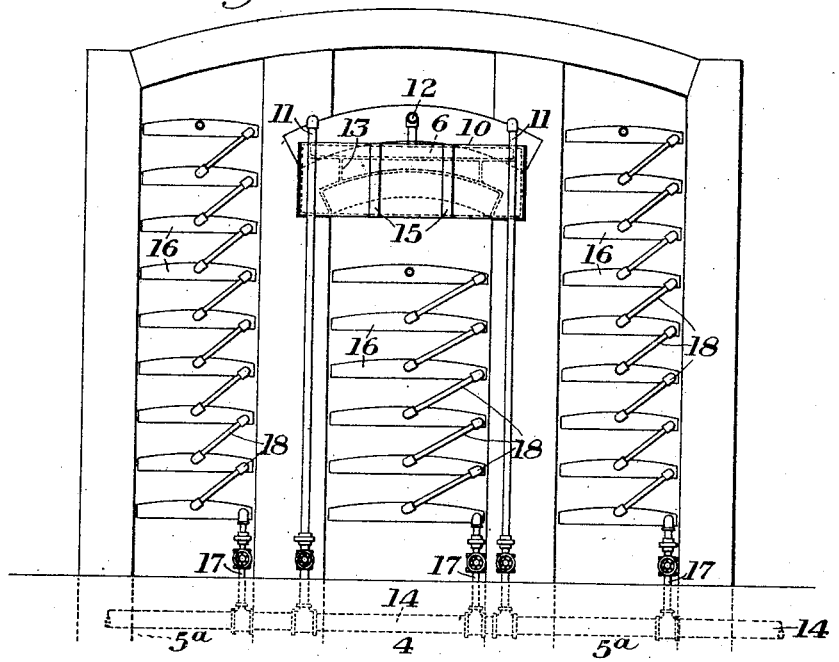
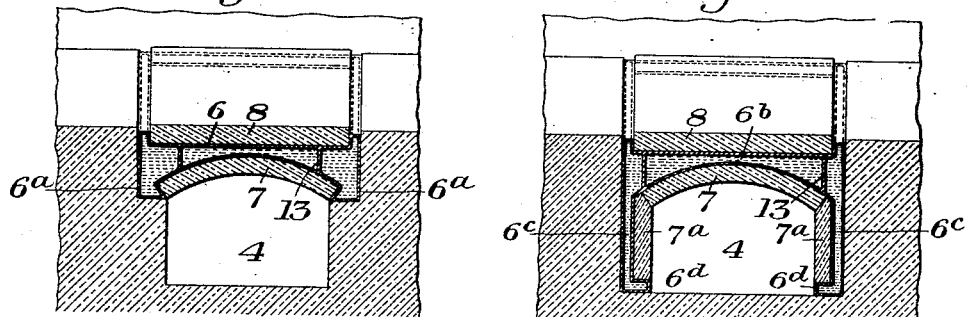
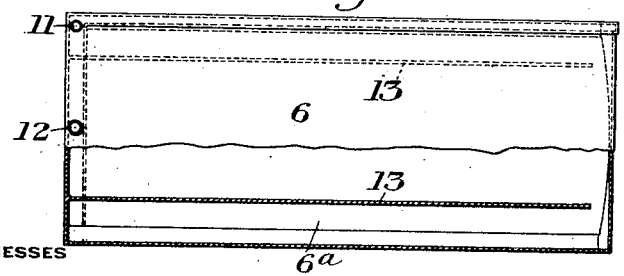
WITNESSES
R. A. Balderson,
W. W. Swartz.
INVENTORS:—
L. L. Knox
M. Murray
by Bakewell Byrnes & Parmelee
their attys

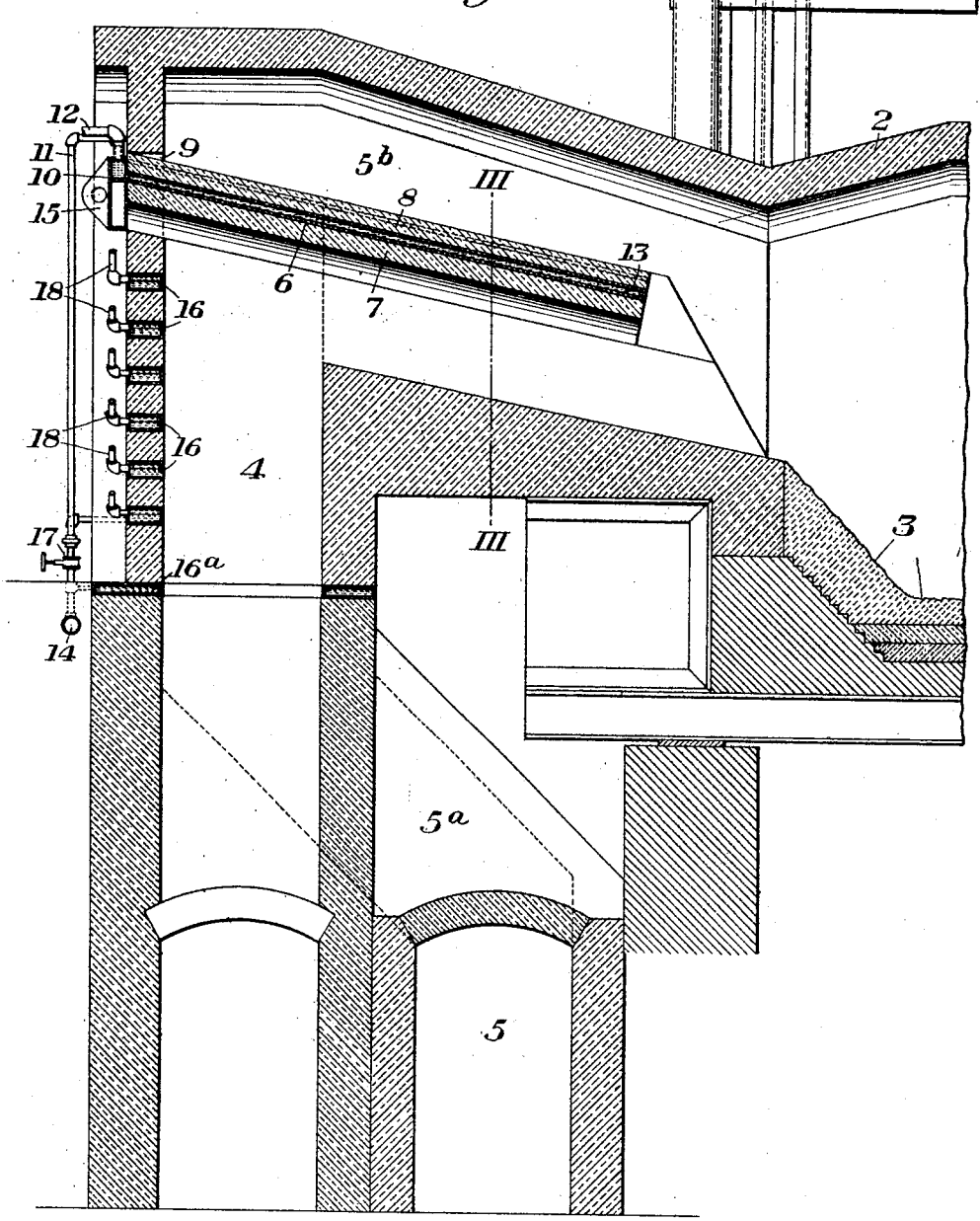

L. L. KNOX & M. MURRAY.
OPEN HEARTH FURNACE.
APPLICATION FILED FEB. 17, 1908.

919,184.

Patented Apr. 20, 1909.
4 SHEETS—SHEET 3.

WITNESSES
R. H. Balderson
W. W. Swartz

INVENTORS:—
L. L. Knox,
M. Murray,
by Bakewell Byrnes & Parmelee
their attys

L. L. KNOX & M. MURRAY.
OPEN HEARTH FURNACE.
APPLICATION FILED FEB. 17, 1908.
919,184.
Patented Apr. 20, 1909.
4 SHEETS—SHEET 4.
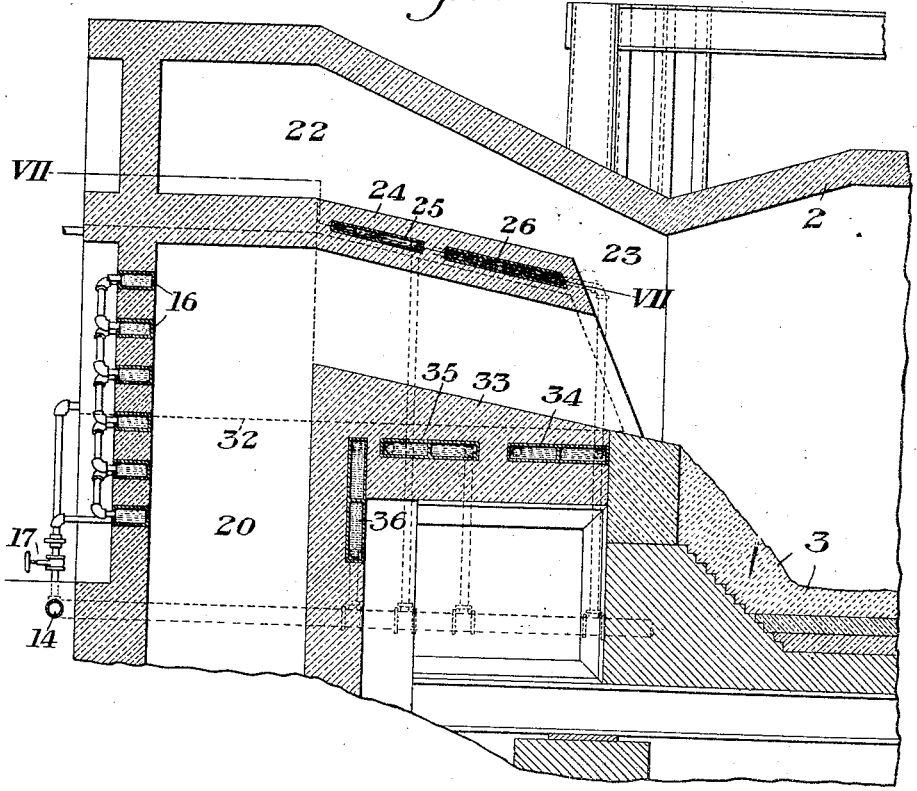
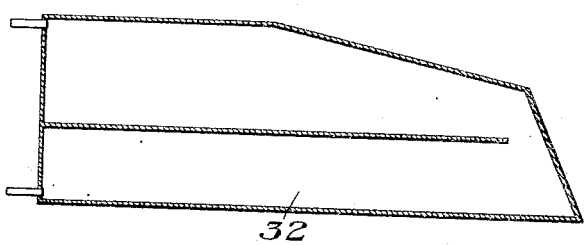
WITNESSES
INVENTORS:-

UNITED STATES PATENT OFFICE.

LUTHER L. KNOX, OF BEN AVON, AND MONTGOMERY MURRAY, OF WILKINSBURG, PENNSYLVANIA, ASSIGNORS TO KEYSTONE FURNACE CONSTRUCTION COMPANY, OF PITTSBURG, PENNSYLVANIA, A CORPORATION OF PENNSYLVANIA.

OPEN-HEARTH FURNACE.

No. 919,184.     Specification of Letters Patent.     Patented April 20, 1909.

Application filed February 17, 1908. Serial No. 416,185.

*To all whom it may concern:*

Be it known that we, LUTHER L. KNOX, of Ben Avon, Allegheny county, Pennsylvania, and MONTGOMERY MURRAY, of Wilkinsburg, Allegheny county, Pennsylvania, have invented a new and useful Improvement in Open-Hearth Furnaces, of which the following is a full, clear, and exact description, reference being had to the accompanying drawings, forming part of this specification, in which—

Figure 6:
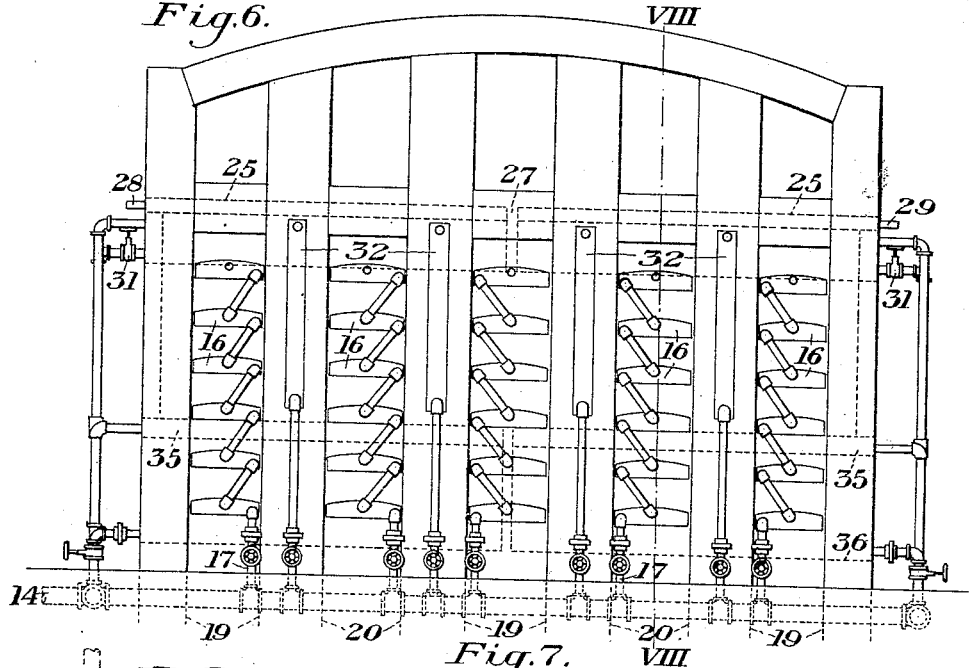
Figure 7:
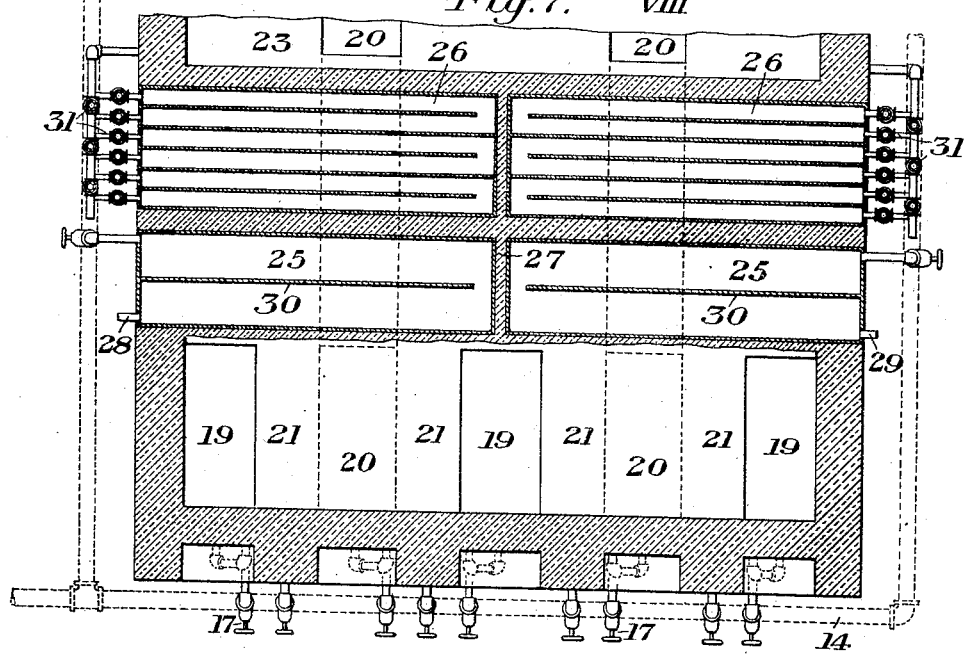

Figure 1 is a vertical section of a portion of an open hearth furnace, and showing one embodiment of our invention; Fig. 2 is a front elevation of the same; Fig. 3 is a detail section taken on the line III—III of Fig. 1; Fig. 4 is a similar section showing a modification; Fig. 5 is a plan view partly in section of one of the cooling boxes or plates; Fig. 6 is an end view of a furnace embodying a modified form of our invention; Fig. 7 is a horizontal section of the same taken on the line VII—VII of Fig. 8; and Fig. 8 is a vertical section on the line VIII—VIII of Fig. 6. Fig. 9 is a detail sectional view of one of the cooling boxes.

Our invention has relation to open hearth furnaces, and is designed to provide means of improved and effective character for protecting the gas and air ports of the furnaces from the destructive action of the heat and hot gases, and relates more particularly to a novel arrangement of cooling plates or boxes in the walls of the gas and air ports and to the construction of the arch which separates the gas and air ports, and to the manner of cooling the same.

The precise nature of our invention will be best understood by reference to the accompanying drawings, in which we have shown several different embodiments thereof, and which will now be described, it being premised, however, that various changes may be made therein by those skilled in the art without departing from the spirit and scope of our invention as defined in the appended claims.

Referring to the form of our invention which is shown in Figs. 1, 2 and 3, the numeral 2 designates the walls of an open hearth furnace, which is in general of ordinary construction. 3 designates a portion of the furnace hearth. 4 designates a gas port leading into one end of the furnace, and 5 designates an air port, which is forked at its upper portion with branches 5$^a$, which extend upwardly at opposite sides of the gas port, and which open into the furnace at 5$^b$ above the arch, which forms the separating wall between the discharge portions of the gas and air ports. The arch consists of a hollow box or casting 6, which extends across the top of the gas port with side portions or legs 6$^a$ (see Fig. 3), which extend a short distance down at opposite sides of the gas port and form a seat for the refractory lining 7, which constitutes that portion of the arch which directly forms the upper wall of the gas port. The upper portion of the hollow box or casting 6 forms a seat for the refractory material 8, which constitutes the bottom of the air port 5$^b$. This arch is inserted through an opening 9 in the end wall of the furnace, and the box or casting 6 has an extension 10 outside the end wall of the furnace, to which are connected the water-circulating pipes 11 and 12. We preferably provide the box or casting 6 with interior longitudinally extending baffles 13, which provide for a proper circulation of the water therein and keeps inflowing water in contact with the entire outer walls thereof. For this purpose, we preferably provide two inlet pipes 11, which lead into opposite side portions of the box, with a single central discharge pipe 12. The pipe 12 may be supplied by suitable pipe or main 14. The extension 10 of the box or casting 6 is preferably provided with means such as indicated at 15, for the engagement therewith of withdrawing means so that the entire arch can be removed from the furnace when burned out and a new arch substituted. 16 designates a plurality of cooling boxes or plates, which are inserted into the outer vertical walls of the air and gas ports, each port having its own series of cooling boxes as shown in Fig. 2. These cooling boxes may be supplied with water by valved connections 17 with the supply pipe 14 before referred to, the several boxes in each series being connected by the pipes 18, each of which lead from the highest point of one box to one of the low points of the next succeeding box above it. These boxes 16 serve to prevent the end walls of the gas and air ports from cutting away under the destructive action of the hot gases when the furnace is reversed, it being understood that the furnace is provided with a similar arrangement of ports at each end, in accordance with the usual practice, and the direction of the entering gas and air and of the outgoing gases from the furnace being reversed in the usual manner. Each end of the furnace will have its ports provided with cooling means such as above described. We also preferably provide a cooling plate 16ª in the joint between the upper and lower portions of the walls of the gas and air flues.

In the modification shown in Fig. 4, the hollow box or casting 6ᵇ in the arch between the gas and air ports, is formed with the depending leg portions 6ᶜ, which extend down at opposite sides of the gas port to the bottom thereof. These legs terminate at their lower ends in the inward extensions 6ᵈ, which form supports for the refractory side linings 7ª for the port. In this manner this water-cooled box or casting is made to carry the refractory lining for both the top and sides of the gas port and provides effective cooling means for these three walls of the port.

In the modification shown in Figs. 6, 7, 8 and 9, there are three air ports, 19, and two gas ports 20, these ports being separated from each other by the intermediate walls or piers 21. The air ports communicate at their upper ends with the chamber 22, which opens into the end of the furnace by the passage 23. In this construction, the arch 24 over the gas ports is built as an integral part of the walls of the ports, and is cooled by means of the hollow cooling plates or boxes 25 and 26. These boxes 25 and 26 are inserted into chambers provided therefor within the masonry of the arch through openings in opposite side walls of the furnace, in the manner shown in Fig. 7, their inner ends being preferably separated from each other by an intervening wall of refractory material 27. The boxes 25 are provided with the circulating connections 28 and 29, and with the interior baffles 30. The boxes 26 are provided with the valved circulating connections 31, and are divided into a plurality of separate compartments, as shown in Fig. 7, each compartment having its own circulating connections. In this manner, should the compartment nearest the entrance to the furnace become burned out, the water may be shut out of that compartment and so on until the arch has burned back to the last compartments of the boxes 26. We also preferably place in each of the intervening walls or piers 21 between the gas and air ports, a cooling box or plate 32, which is inserted into an opening into a chamber to receive the same from the end of the furnace. These cooling boxes 32 (one of which is shown in detail in Fig. 9), extend inwardly to the point where the gas ports discharge into the furnace, and effectively protect the side walls of these ports. We also preferably provide the bridge or arch 33, which constitutes the lower wall portion of the gas ports with cooling boxes 34, 35, which are inserted therein from the sides of the furnace in a manner similar to the boxes 25 and 26. We also preferably provide the inner or rear wall of the uptake of the port with a cooling box 36, which can be inserted and renewed in the same manner.

By means of our invention, the arches separating the gas and air ports, together with the walls of the ports which are most subject to destructive action, are effectively protected. The cooling plates or boxes are readily accessible, and can be replaced and renewed when they are burned out. Our invention, therefore, greatly prolongs the life of the ports as a whole, and limits the renewals and repairs to the portions thereof which can be readily removed and replaced.

It will be obvious that our invention is not limited to the particular arrangement of cooling plates or boxes which we have herein shown and described, since these may be arranged in various ways. The circulating connections may also be changed, as may be most convenient in any particular case, as may also be the arrangement of baffles within the plates or boxes. It will also be obvious that our invention is applicable to other forms of regenerative reversing furnaces.

The specific form of our invention which is shown in Figs. 6, 7 and 8 forms the subject matter of a divisional application Serial Number 442,455 filed July 8th, 1908.

What we claim is:—

1. In a furnace of the character described, having gas and air ports, an arch separating the said ports, said arch consisting of a water-cooled box or casting therein and a refractory covering for said box or casting at both its upper and lower sides, said covering being supported by the box or casting; substantially as described.

2. A furnace of the type described having gas and air ports, an arch forming the separating wall between said ports and consisting of a hollow water-cooled box or casting and upper and lower coverings of refractory material supported by the casting, said arch being removable as a whole through a wall of the ports; substantially as described.

3. In a furnace of the type described, an arch separating the gas and air ports, said arch consisting of a hollow water-cooled box or casting, refractory coverings supported by said box or casting at both its upper and lower sides, said box or casting, together with its coverings, being bodily removable through the walls of the ports, and circulating pipes connected to an extension of the box or casting and exteriorly of the end wall; substantially as described.

4. In a furnace of the type described, a gas port, an air port above the gas port, a hollow water-cooled box or casting placed intermediate the said ports and having legs or extensions at its sides which extend downwardly at opposite sides of the gas port, a refractory lining forming the upper and lateral walls of the gas port supported by said casting, and a refractory covering forming the bottom of the air port and also supported by said box or casting; substantially as described.

5. In a reversing, regenerative furnace, a removable arch separating the gas and air ports, said arch consisting of a hollow water-cooled box or casting and a body of refractory material surrounding and supported by said box or casting, substantially as described.

6. In a reversing, regenerative furnace, a removable arch separating the gas and air ports, said arch consisting of a hollow water-cooled box or casting provided with downwardly-extending lateral legs or extensions of said casting, and a body of refractory material supported by said legs or extensions, substantially as described.

7. In a furnace of the character described, a removable arch separating the gas and air ports, said arch consisting of a hollow water-cooled box or casting formed with depending lateral portions or legs, and refractory material supported by said legs and forming the roof of the gas port; substantially as described.

8. In a furnace of the character described, a removable arch separating the gas and air ports, said arch consisting of a hollow water-cooled box or casting formed with depending lateral portions or legs, and refractory material supported by said legs and forming the roof and also the lateral walls of the gas port; substantially as described.

9. A furnace of the character described, having a gas port leading into the furnace, and removable water-cooled boxes within the lower wall of said port; substantially as described.

10. A furnace of the character described, having a gas port leading into the furnace, and removable water-cooled boxes within the lower and inner walls of said port; substantially as described.

11. In a furnace of the character described, an arch separating the gas and air ports and containing a water-cooled box or casting having lateral depending skew-backs; substantially as described.

12. In a furnace of the type described, an arch separating the gas and air flues, said arch being bodily removable and having hollow side members, together with means for circulating water therethrough, and upper and lower refractory material carried by said side members, substantially as described.

13. A furnace of the type described, having an arch separating its gas and air flues, said arch having hollow side members supported on the side walls of the furnace and carrying upper and lower refractory material, and means for effecting a water circulation through said side members, substantially as described.

14. In a furnace of the character described, an arch separating the gas and air flues, said arch having hollow longitudinally extending side members formed with downwardly extending water legs, said side members and the downwardly extending water legs supporting and carrying the upper and side walls of the gas flue, together with connections for circulating water through said side members, substantially as described.

15. In a furnace of the character described, an arch separating the air and gas flues, said arch having hollow metallic side members formed with downwardly extending water legs which support the refractory top and side walls of the gas flue, and a refractory bottom for the air flue also carried by said side members, together with connections for circulating water through said side members, substantially as described.

16. In a furnace of the character described, having gas and air ports, an arch forming the separating wall between said ports, said arch having a water-cooled box or casting and a refractory lining or covering on both sides of the casting, said arch being bodily removable in a horizontal direction through a wall of the furnace; substantially as described.

17. In a furnace of the type described, having adjacent gas and air ports separated by a wall, and hollow water-cooled plates or boxes inserted in the wall between said ports and removable through an opening in a vertical wall of the furnace; substantially as described.

18. A furnace of the type described having gas and air ports, an arch separating said ports, and hollow water-cooled boxes or castings extending into said arch, said arch being bodily removable through one of the vertical walls of the furnace; substantially as described.

19. A cooler for the mouths of the air and gas ports of open hearth furnaces, comprising an arched hollow water-cooled casing having hollow extensions or skew-backs at the ends of the casing.

In testimony whereof, we have hereunto set our hands.

LUTHER L. KNOX.
MONTGOMERY MURRAY.

Witnesses:
GEO. B. BLEMING,
R. A. BALDERSON.